United States Patent
Winton et al.

(10) Patent No.: US 11,052,801 B2
(45) Date of Patent: Jul. 6, 2021

(54) VEHICLE HEADREST WITH SPEAKERS AND CONTROL FOR ADAPTIVE SPATIAL PERFORMANCE

(71) Applicant: Harman International Industries, Incorporated, Stamford, CT (US)

(72) Inventors: Riley Winton, Canton, MI (US); Chris Ludwig, Troy, MI (US); Riley Iakovidis, Novi, MI (US); David Mossington, Novi, MI (US); Lars Goller, Struer (DK); Martin Olsen, Struer (DK)

(73) Assignee: Harman International Industries, Incorporated, Stamford, CT (US)

( * ) Notice: Subject to any disclaimer, the term of this patent is extended or adjusted under 35 U.S.C. 154(b) by 84 days.

(21) Appl. No.: 16/153,227

(22) Filed: Oct. 5, 2018

(65) Prior Publication Data
US 2019/0106039 A1 Apr. 11, 2019

Related U.S. Application Data

(60) Provisional application No. 62/569,314, filed on Oct. 6, 2017.

(51) Int. Cl.
| | |
|---|---|
| *B60N 2/879* | (2018.01) |
| *B60N 2/803* | (2018.01) |
| *H04R 1/02* | (2006.01) |
| *H04R 1/32* | (2006.01) |
| *H04R 5/02* | (2006.01) |

(52) U.S. Cl.
CPC ............ *B60N 2/879* (2018.02); *B60N 2/803* (2018.02); *H04R 1/025* (2013.01); *H04R 1/026* (2013.01); *H04R 1/323* (2013.01); *H04R 5/023* (2013.01); *H04R 2201/025* (2013.01); *H04R 2499/13* (2013.01)

(58) Field of Classification Search
CPC ............................... B60N 2/879; H04R 5/023
See application file for complete search history.

(56) References Cited

U.S. PATENT DOCUMENTS

| | | | | |
|---|---|---|---|---|
| 3,512,605 | A * | 5/1970 | McCorkle | H04R 5/023 381/301 |
| 3,976,162 | A * | 8/1976 | Cummings | H04R 1/02 181/141 |
| 4,042,791 | A * | 8/1977 | Wiseman | H04R 5/023 381/109 |
| 5,997,091 | A * | 12/1999 | Rech | B60N 2/885 297/391 |

(Continued)

FOREIGN PATENT DOCUMENTS

WO    WO2017160594    9/2017

OTHER PUBLICATIONS

European Search report for application No. EP 18198754, dated Feb. 19, 2019.

*Primary Examiner* — David R Dunn
*Assistant Examiner* — Tania Abraham
(74) *Attorney, Agent, or Firm* — McCoy Russell LLP

(57) ABSTRACT

The present disclosure relates to vehicle speaker systems and configurations. In one embodiment, a vehicle headrest is provided including a head support, loudspeakers, and loudspeaker supports. The loudspeaker supports can position and direct the loudspeakers in at least one of a retracted and extended position.

16 Claims, 6 Drawing Sheets

(56) References Cited

U.S. PATENT DOCUMENTS

| | | | | |
|---|---|---|---|---|
| 6,654,474 B2* | 11/2003 | Bito | ............... | H04M 1/03 |
| | | | | 381/189 |
| 6,744,898 B1 | 6/2004 | Hirano | | |
| 7,684,577 B2* | 3/2010 | Arai | ............... | A47C 7/72 |
| | | | | 381/302 |
| 8,655,008 B2* | 2/2014 | Jagne | ............... | H04R 5/023 |
| | | | | 381/386 |
| 8,950,813 B2* | 2/2015 | Nawaz | ............... | B60N 2/806 |
| | | | | 297/406 |
| 9,555,890 B2* | 1/2017 | Tracy | ............... | H04R 5/023 |
| 10,457,179 B1* | 10/2019 | Kentley-Klay | ............... | B60N 2/879 |
| 2004/0021350 A1 | 2/2004 | House | | |
| 2016/0023763 A1* | 1/2016 | Tracy | ............... | H04R 5/023 |
| | | | | 381/301 |

\* cited by examiner

VEHICLE HEADREST WITH SPEAKERS AND CONTROL FOR ADAPTIVE SPATIAL PERFORMANCE

CROSS-REFERENCE TO RELATED APPLICATION

This application claims priority to U.S. Provisional Application No. 62/569,314 filed on Oct. 6, 2017 and titled VEHICLE HEADREST WITH SPEAKERS AND CONTROL FOR ADAPTIVE SPATIAL PERFORMANCE, the content of which is expressly incorporated by reference in its entirety.

FIELD

The present disclosure relates to vehicle speaker systems and configurations, and more particularly to vehicle headrest configurations with speakers and control for adaptive spatial performance.

BACKGROUND

Modern vehicle systems use a variety of speakers and speaker configurations. Sound quality and performance of vehicle sound systems are an important service of vehicles. In many existing designs, speakers are typically mounted in passenger doors or along a front or rear dash of the vehicle due to spacing and other constraints. There is a desire to improve upon the conventional vehicle configurations of four or five vehicle speakers. While conventional vehicle configurations allow for fading sound to the front or back of a vehicle and for panning sound to the left or right side of a vehicle, the overall effect is to limit sound to a particular section of a vehicle from speakers having a fixed position.

Existing vehicle loudspeaker configurations are often the result of "shoe-horned" designs, where speakers can only be placed in a small envelope with little position optimization for acoustics. In return, acoustic performance is often compromised. Even in situations where speaker placement can be somewhat optimized, performance of the speaker is often unrealized. There exists a desire to provide significant performance improvements in vehicle speaker systems.

BRIEF SUMMARY OF THE EMBODIMENTS

Disclosed and claimed herein are vehicle speaker systems and configurations. In one embodiment, a vehicle headrest includes a head support, a first loudspeaker, a second loudspeaker, a first loudspeaker support configured to position and direct the first loudspeaker, and a second loudspeaker support configured to position and direct the second loudspeaker. The first loudspeaker support and second loudspeaker support are coupled to the head support and wherein the first loudspeaker support and second loudspeaker support are configured to position the first and second loudspeakers each in a first arrangement and a second arrangement.

In one embodiment, the head support includes a headrest cushion, and the first loudspeaker and second loudspeaker are arranged on lateral portions of the head support.

In one embodiment, the head support is configured to receive the first loudspeaker and the second loudspeaker when arranged in a first position.

In one embodiment, the first loudspeaker support and the second loudspeaker support are lateral headrest support elements configured to extend and retract relative to the head support.

In one embodiment, the first loudspeaker support and the second loudspeaker support are support arms configured to extend relative to the head support to position the first and second loudspeakers in the second arrangement.

In one embodiment, the first loudspeaker support and the second loudspeaker support mechanically adjust the position and direction of first and second loudspeakers.

In one embodiment, the first loudspeaker support and the second loudspeaker support are positioned by at least one of a motorized, actuator driven, spring driven and manual positioning.

In one embodiment, first loudspeaker support and the second loudspeaker support are side support arms configured to support and position the first and second loudspeakers to be positioned adjacent the headrest in the first position and in an extended position from headrest in the second position for direction towards a passenger.

In one embodiment, the first loudspeaker and the second loudspeaker each include at least one speaker driver.

In one embodiment, the headrest is a portion of a back support member of a vehicle seat.

In one embodiment, the first and second loudspeakers are each configured for a first arrangement to direct sound in a first direction and configured to be positioned the a second arrangement to position and direct the first and second loudspeakers in a second direction, the second direction different from the first direction.

In one embodiment, the first arrangement includes orientation of the first and second loudspeakers to provide a spacious audio configuration and the second arrangement includes orientation of the first and second loudspeakers to provide an isolation audio configuration for a passenger independent sound experience.

In one embodiment, positioning of the first and second loudspeakers is based on a vehicle parameter including at least one of vehicle shutdown, vehicle operational mode, passenger detection, and driving condition.

In one embodiment, the first loudspeaker support and the second loudspeaker support are configured to arrange speakers in one or more of an extended position, retracted position, and intermediary position.

Another embodiment is directed to method for controlling a vehicle headrest. In one embodiment, method includes receiving a headrest control signal to position and direct a first loudspeaker and a second loudspeaker, the first loudspeaker coupled to a first loudspeaker support and the second loudspeaker coupled to a second loudspeaker support, and controlling the first loudspeaker support and the second loudspeaker support to position the first and second loudspeakers.

In one embodiment, the first loudspeaker support and the second loudspeaker support are support arms configured to support and position the first and second loudspeakers, and wherein controlling includes positioning the first loudspeaker and the second loudspeaker from a first position to an extended position.

In one embodiment, controlling includes arranging the first and second loudspeakers in one or more of an extended position, retracted position, and intermediary position headrest to an extended position, retracted position, and intermediary position.

In one embodiment, controlling includes arranging the first and second loudspeakers in one or more of an isolation mode or spacious mode.

In one embodiment, controlling includes positioning of the first and second loudspeakers based on a vehicle parameter including at least one of vehicle shutdown, vehicle operational mode, passenger detection, and driving condition.

Another embodiment is directed to a vehicle headrest including a head support, at least one loudspeaker and at least one loudspeaker support element configured to position and direct the at least one loudspeaker. The at least one loudspeaker element is coupled to the head support element and the at least one loudspeaker, and wherein the at least one loudspeaker support element is configured to position the at least one loudspeaker in a first position to direct sound in a first direction and configured to position the at least one loudspeaker in a second position to direction sound in a second direction.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1A:
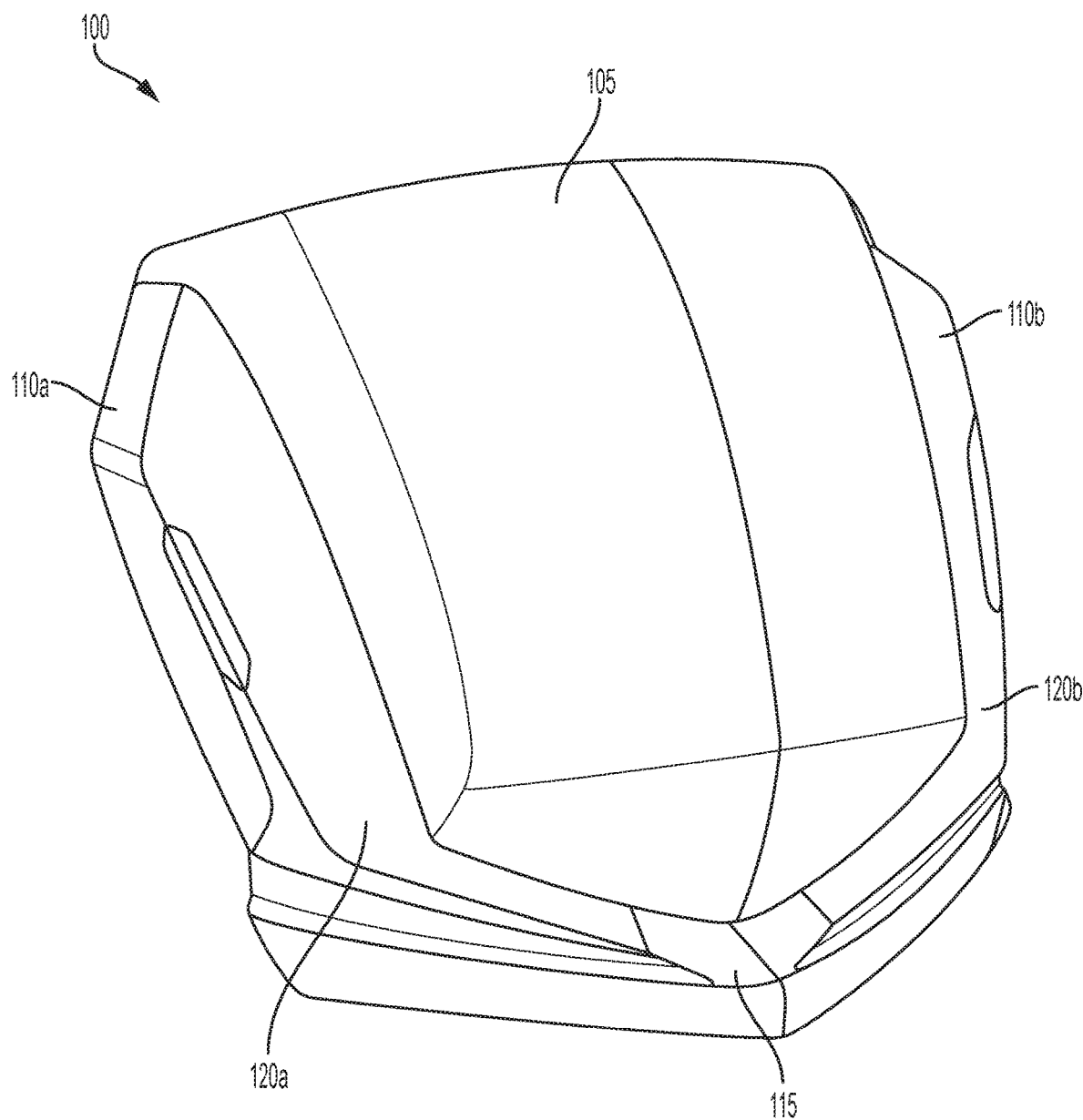
FIGS. 1A-1B depict graphical representations of a vehicle headrest configuration according to one or more embodiments.

One aspect of the disclosure is directed to vehicle headrest configurations. In one embodiment, a vehicle headrest is provided including a plurality speakers. According to another embodiment, a headrest configuration includes one or more elements that can be controlled to mechanically adjust the position of the plurality of speakers. By way of example, the headrest may include at least one speaker and a support element on each side portion of the headrest, the support elements may be controlled to mechanically displace each speaker from at least a first position, such as a retracted position, to an extended position where each speaker may extend out from the headrest and be directed towards a passenger (e.g., passenger ear level).

One embodiment is directed to a vehicle headrest including a head support, at least one loudspeaker and at least one loudspeaker support element configured to position and direct the at least one loudspeaker. The at least one loudspeaker element is coupled to the head support element and the at least one loudspeaker, and wherein the at least one loudspeaker support element is configured to position the at least one loudspeaker in a first position to direct sound in a first direction and configured to position the at least one loudspeaker in a second position to direction sound in a second direction.

The vehicle headrest may include a pair of loudspeakers, such as left and right loudspeakers. In one embodiment, a vehicle headrest includes a head support, a first loudspeaker, a second loudspeaker, a first loudspeaker support configured to position and direct the first loudspeaker, and a second loudspeaker support configured to position and direct the second loudspeaker. The first loudspeaker support and second loudspeaker support are coupled to the head support and wherein the first loudspeaker support and second loudspeaker support are configured to position the first and second loudspeakers each in a first arrangement and a second arrangement.

A vehicle headrest can relate to a cushion, support, or other structural element located at the top portion of a vehicle seat. Headrests may be removable support elements located at the top of a passenger seat in a vehicle associated with supporting each passengers head. In bench seat and bucket seat configurations, the headrest is associated with a single passenger. In certain embodiments, the headrest may be associated with a back support member of the vehicle seat and include padding elements in addition to the back support member. In one embodiment, a headrest configuration is provided including a plurality of speakers. The headrest configuration can include a mechanism for positioning at least two speaker elements relative to a vehicle headrest. In certain embodiments, the vehicle headrest configurations include one or more elements for displacement of speakers, which may include mechanical and/or motorized elements.

Another aspect of the disclosure is directed to controlling adaptive spatial performance of vehicle speakers, such as headrest speakers. Physical orientation of a set of loudspeakers may be controlled to enable adaptive performance. In one embodiment, headrest loudspeakers may be configured to provide a "spacious audio" configuration, or audio reproduction intent on enhancing audio experience by creating the feeling of big sound or large acoustic spaces. According to another embodiment, headrest loudspeakers may be configured to provide an "isolation audio" configuration which focuses on isolating seat occupant audio experience and may provide an independent sound experience for each passenger. Configurations and embodiments discussed herein overcome the difficulties in opposite speaker mounting and packaging methodologies such that a headrest design is provided to adapt to improve performance in both spacious audio and isolation audio use cases.

Embodiments are also directed to processes and device configurations for control of headrest elements, such as speakers and headrest elements. In certain embodiments, processes may be provided to determine position and placement of vehicle elements.

In one embodiment, a method for controlling a vehicle headrest includes receiving a headrest control signal to position and direct a first loudspeaker and a second loudspeaker. The first loudspeaker may be coupled to a first loudspeaker support and the second loudspeaker coupled to a second loudspeaker support. The method includes controlling the first loudspeaker support and the second loudspeaker support to position the first and second loudspeakers.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1B:
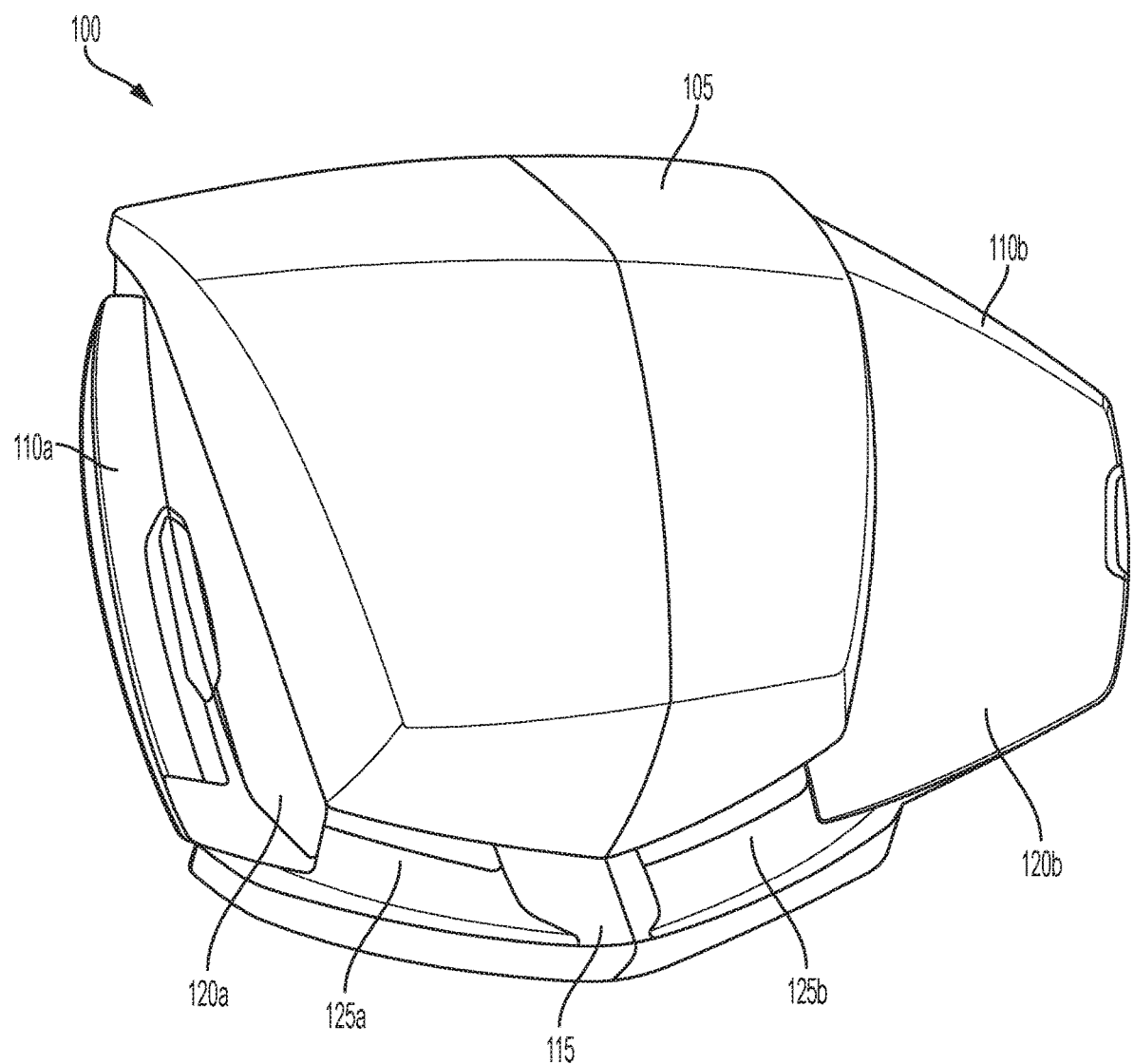

Referring now to the figures, FIGS. 1A-1B depict graphical representations of a vehicle headrest configuration according to one or more embodiments. According to one embodiment, headrest 100 includes a head support 105, side supports 110a-110b, and speakers 120a-120b. According to another embodiment, headrest 100 includes base support 115 configured to connect with a seat support. Base support 115 may provide a mounting surface or structure for head support 105. According to one embodiment, side supports 110a-110b provide a backing to retain and allow for mounting of speakers 120a-120b. As such, side supports 110a-110b include a structural shape that includes a portion which is retractable behind head support 105 in a retracted portion. In other embodiments, side supports 110a-110b may be one or more arms that may support and position speakers 120a-120b, such that speakers 120a-120b may be shaped or formed to be positioned adjacent head support 105 or in an extended position from head support 105.

In one embodiment, head support 105 may be a cushion element of headrest 100. Head support 105 may support and protect a passengers head during an impact event and may be secured to base support 115. In the lateral direction of head support 105 are side supports 110a-110b. Headrest 100 may include one or more elements, as will be described herein, within and/or behind heard support 105 to allow for positioning of moveable side supports 110a-110b and speakers 120a-120b.

According to one embodiment, vehicle headrest 100 includes a plurality of speaker elements that may be controlled to provide a plurality of spatial configurations. Headrest 100 may employ mechanical actuation (e.g., motorized, actuator driven, spring driven and/or retraction, etc.) to move the physical orientation of a set of loudspeakers to enable adaptive performance. While the discussion herein describes mechanical operation to extend and retract speakers 120a-120b of headrest 100, it may be appreciated that one or more embodiments may allow for push button and/or manual (e.g., by hand) release and retraction of side supports 110a-110b and speakers 120a-120b. Speakers 120a-120b relate to left and right side speakers, or first and second loudspeakers, associated with headrest 100. According to one embodiment, speakers 120a-120b may each include one or more speaker elements and/or an array of speakers. Speakers 120a-120b may be employed in addition to and/or independently from other vehicle speakers.

According to one embodiment, side supports 110a-110b relate to loudspeaker supports (e.g., first and second loudspeaker supports) for speakers 120a-120b (e.g., first and second loudspeakers). Side support 110a is configured to support and position speaker 120a, and side support 110b is configured to support and position speaker 120b. Side supports 110a-110b are coupled to the head support 105 and configured to position the first and second loudspeakers each in at least a first arrangement and a second arrangement.

FIG. 1A depicts headrest 100 with side supports 110a-110b in a retracted position. In the retracted position, speakers 120a-120b may direct output in at a least a forward direction. The retracted position of speakers 120a-120b, and one or more control signals, may allow for a spacious audio configuration. The retracted position directs speaker output more generally towards the passenger and cabin to provide an acoustic landscape having a larger feel.

FIG. 1B depicts headrest 100 with side supports 110a-110b and speakers 120a-120b in an extended position. By way of example, side supports 110a-110b and speakers 120a-120b may extend out from headrest 100 and head support 105 to allow for speakers 120a-120b to be directed towards passenger ears. The extended position of speakers 120a-120b, and one or more control signals, may allow for a isolation audio configuration. In an isolation configuration, sound from speakers 120a-120b may be focused towards passengers' ears providing a more direct acoustic transmission path. Additionally the position of the speaker embodiments may positively influence the amount of passive acoustic separation between occupants, a critical factor in isolation audio configurations. In certain embodiments, audio may be routed to specific passengers and an extended configuration may allow for one or more passengers to have a dedicated audio output. The isolation configuration may allow for passengers to listen to a desired audio channel without affecting other passengers in the vehicle.

According to one embodiment, extension of speakers 120a-120b into an extended position may reveal openings 125a-125b in base support 115. Openings 125a-125b may allow for storage of side supports 110a-110b and speakers 120a-120b.

In FIGS. 1A-1B, speakers 120a-120b are arranged on lateral portions of the head support 105. In one embodiment, FIG. 1A shows speakers 120a-120b arranged in a first position or retracted position. Loudspeaker supports for 120a-120b are lateral headrest support elements configured to extend and retract relative to head support 105.

According to one embodiment, loudspeaker supports can mechanically adjust the position and direction of headrest loudspeakers. Loudspeaker supports may be positioned by at least one of a motorized, actuator driven, spring driven and manual positioning. For example, loudspeaker supports (e.g., first and second loudspeaker supports) may be side support arms configured to support and position the loudspeakers (e.g., first and second loudspeakers) to be positioned adjacent the headrest in the first position and in an extended position from headrest 100 in the second position for direction towards a passenger. Speakers 120a-120b may each include each include at least one speaker driver. Speakers 120a-120b may be configured for a first arrangement to direct sound in a first direction and configured to be positioned in a second arrangement to position and direct the first and second loudspeakers in a second direction, the second direction is different from the first direction. Speakers 120a-120b and side supports 110a-110b may be configured for arrangement in one or more of an extended position, retracted position, and intermediary position.

Although FIGS. 1A-1B show retracted and extended positions, it should be appreciated that one or more intermediary positions may be provided. It should also be appreciated that one or more elements of headrest 100 may be modified as described herein.

Figure 2:
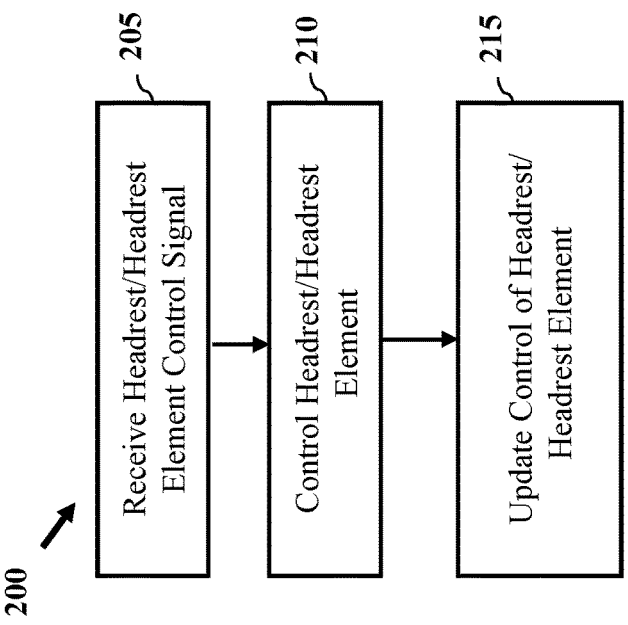
FIG. 2 depicts a process for headrest control according to one or more embodiments.

FIG. 2 depicts a process for headrest control according to one or more embodiments. Process 200 may be employed by a vehicle control unit, such as an infotainment unit, head unit, and/or control unit to control one or more headrests (e.g., head rest 100) and headrest elements (e.g., speakers 120a-120b). Process 200 may be initiated by receiving a headrest control signal or head rest element control signal at block 205. In one embodiment, headrest control signals may be one or more control signals to direct position of speakers of the headrest to at least one of an extended position, retracted position, and intermediary position. In addition to control of position, headrest control signals may relate to audio data, speaker control, etc.

Process 200 may include receiving a headrest control signal to position and direct a first loudspeaker and a second loudspeaker, such as a first loudspeaker coupled to a first loudspeaker support and a second loudspeaker coupled to a second loudspeaker support. Process 200 may also include controlling the first loudspeaker support and the second loudspeaker support to position the first and second loudspeakers.

At block 210, the headrest may be controlled based on the control signal received at block 205. In one exemplary embodiment, headrest control includes moving the headrest from a current position to second position. By way of example, the headrest may controllably move one or more side elements (e.g., side supports 110a-110b, speakers 120a-120b, etc.) from a retracted to an extended position, or vice versa. In some cases, the control signal may be generated by passenger selection of a mode, such as an isolation mode or spacious mode, that directs the headrest to control position of speaker elements. Passenger selections may be detected based on activation of vehicle buttons and/or selections of an infotainment or other passenger interface.

Loudspeaker supports may be controlled by positioning the first loudspeaker and the second loudspeaker from a first position to an extended position. Controlling can include arranging the first and second loudspeakers in one or more of an extended position, retracted position, and intermediary position headrest to an extended position, retracted position, and intermediary position. Controlling can include arranging the first and second loudspeakers in one or more of an isolation mode or spacious mode. Controlling can include positioning of the first and second loudspeakers based on a vehicle parameter including at least one of vehicle shutdown, vehicle operational mode, passenger detection, driving condition.

At block 215, process 200 can update control of the headrest and one or more headrest elements. Process 200 allows for continuous, or regular, monitoring of vehicle control signals such that passenger selections or vehicle events can trigger modifying position of headrest elements. In one exemplary embodiment, vehicle shutdown or certain operational modes may control headrest position. For example, shutdown of the vehicle may automatically direct a headrest to a retracted position. Alternatively, passenger detection may result in positioning of headrest elements based on one or more passenger presets. According to another embodiment, driving conditions, such as highway vs. local driving may prompt the vehicle control unit to position speaker elements.

According to one embodiment, control of headrest elements and updating of headrest element position may be based on conversion of detected vehicle parameters and audio control signals and commands. Similarly, audio data detected within the vehicle based on headrest position may be used to analyze optimal speaker position. Identification of control settings may be based on one or more deep learning algorithms. In one embodiment, identification of speaker output for an isolation mode or spacious mode includes identifying sound parameters within the vehicle. The parameters can identify at least one of signal levels, propagation, and perception of different sound sources (e.g., audio vs. vehicle notifications). In one embodiment, targets relate to perceptibility of commands. Sound waves may be processed by converting the sound waves to sampled representations and recognizing sounds based on a scoring the highest likelihood. Recognized sounds can influence the next calculation to improve the accuracy associated with perceptibility. Once sound is rated in the cabin, one or more speaker settings may be determined and characterized. Similarly to speaker optimization, the commands inferred may be based on previously recognized parameters that influence the perceptibility and allows for improved audio output.

Figure 3:
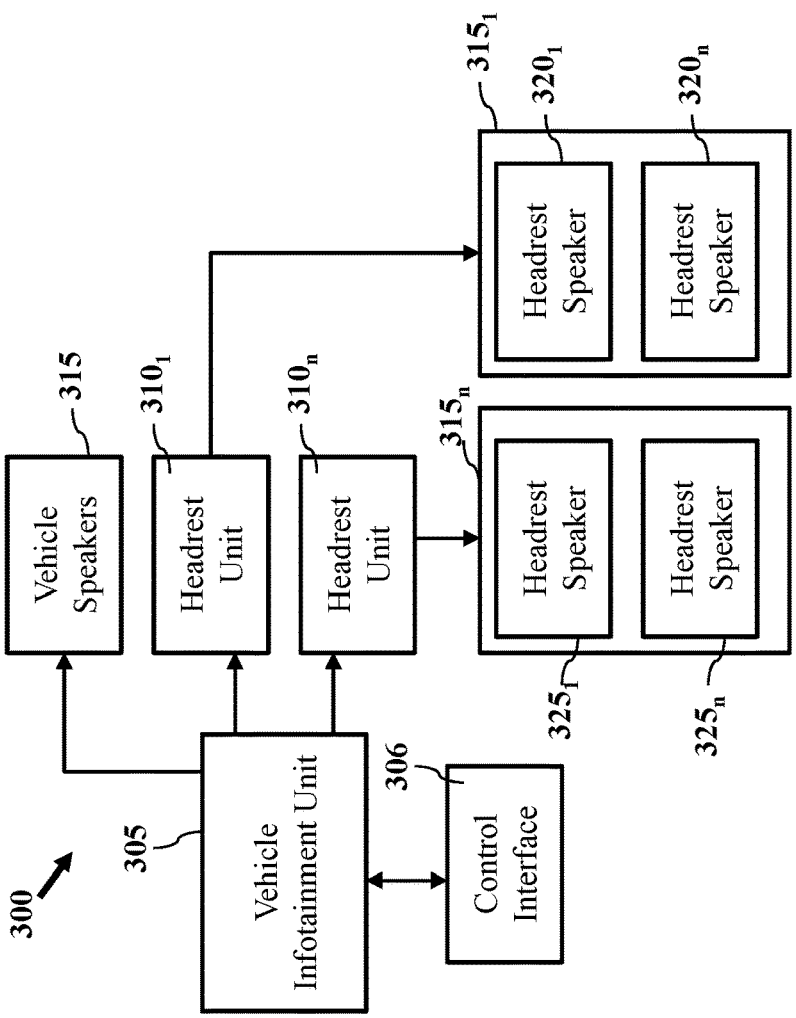
FIG. 3 depicts a graphical representation of a device configuration according to one or more embodiments.

FIG. 3 depicts a graphical representation of a device configuration according to one or more embodiments. System 300 may relate to a vehicle configuration, such as an automobile or passenger vehicle configuration. According to one embodiment, a vehicle infotainment unit 305 may be employed to control one or more vehicle headrests (e.g., headrest 100). Although system 300 and FIG. 3 refer to a vehicle infotainment unit 305, it should be appreciated that other control units may be employed.

System 300 includes vehicle infotainment unit 305 which may provide one or more of driver assistance, navigation, media, and vehicle control features. In one embodiment, system 300 includes control interface 306 which may be employed to provide one or more commands to vehicle infotainment unit 305, including settings for a head rest element. Commands may be directed to one or more of directionality and movable element control as described herein. Control interface 306 may include a display and one or more input controls, such as a touch screen display to present a user interface for vehicle infotainment unit 305 and display of input and adjustment commands.

According to one embodiment, vehicle infotainment unit 305 drives one or more speakers 315 of a vehicle. According to another embodiment, vehicle infotainment unit 305 drives one or more headrest units $310_{1-n}$. Headrest units $310_{1-n}$ may include one or more headrest speakers, such as headrest speakers $315_{1-n}$, and one or more mechanical elements to position headrest speakers $315_{1-n}$. According to one embodiment, each headrest unit includes a plurality of headrest speakers, such as headrest speakers $320_{1-n}$ of head rest unit $310_1$ and headrest speakers $325_{1-n}$ of head rest unit $310_n$. According to another embodiment, and as will be discussed in more detail below, vehicle infotainment unit 305 may be configured to control one or more of headrest units $310_{1-n}$ to allow for one or more adaptive audio modes, such as an isolation configuration and spacious configuration. According to another embodiment, speakers $320_{1-n}$ and $325_{1-n}$ may relate to one or more headrest speakers and may operate as a speaker array.

According to one embodiment, vehicle infotainment unit 305 includes a processor or control unit to perform one or more functions which may be stored in a memory vehicle infotainment unit 305. Vehicle infotainment unit 305 may perform one or more processes described herein for control of the vehicle.

According to one embodiment, vehicle infotainment unit 305 may be trained and/or configured based on one or more deep learning algorithms and convolution networks for conversion of vehicle data to control operations. By way of example, vehicle settings and data may be used to control and/or limit operation of headrest elements. Identification of vehicle settings and events can include identifying parameters for performing control directives. The parameters can identify at least one of a vehicle parameter data set and audio characteristics. In one embodiment, targets relate to elements captured in audio or vehicle data. One or more deep learning algorithms may be employed for conversion of vehicle parameters and conditions, such as speed, to commands for controlling headrest elements.

Figure 4:
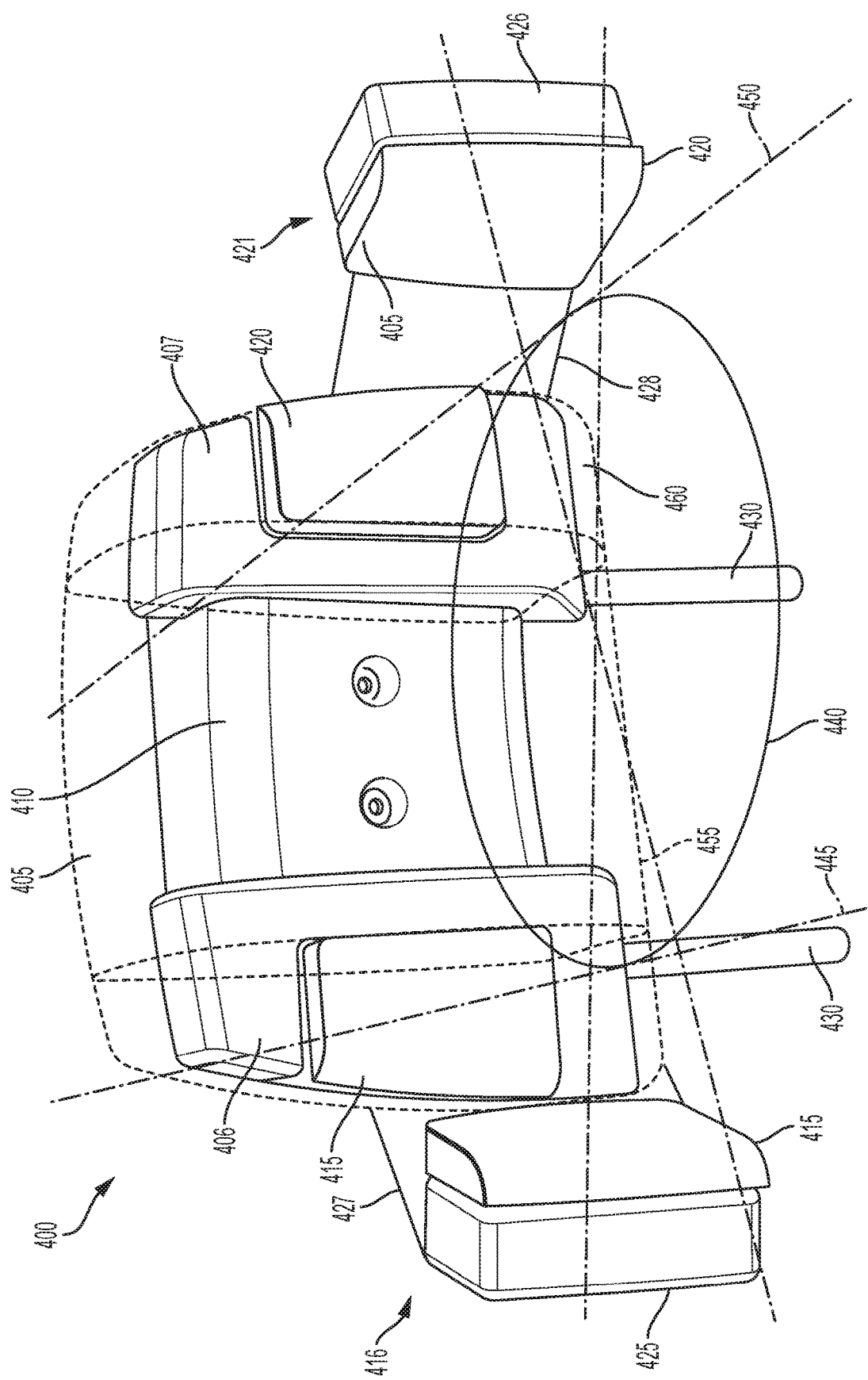
FIG. 4 depicts a graphical representation of a headrest speaker system according to one or more embodiments.

FIG. 4 depicts a graphical representation of a headrest speaker system according to one or more embodiments. Headrest 400 can provide multiple headrest speaker mounting configurations with only one headrest. Headrest 400 includes a cushion 405 (e.g., head support 105), positioning unit 410 and speakers 415 and 420.

Cushion is generally shown by 405 covering positioning unit 410 and side supports 406 and 407 which may be movable by positioning unit 410 to position speakers 415 and 420. FIG. 4 depicts speakers 415 and 420 in a first position within cushion 405. According to one embodiment, speakers 415 and 420 may be positioned to second positions 416 and 421. According to another embodiment, speakers 415 and 420 may include housings, such as back structures 425 and back 426.

Headrest 400 includes headrest mounts 430 extending from the bottom of cushion 405 to allow for mounting to a vehicle seat. In alternate embodiments, headrest 400 may be part of the seat such that positioning unit 410 and cushion 405 are supported by the back support.

In the first position (speakers 415 and 420 within cushion 405), a "spacious audio" configuration may be provided where loudspeakers are next to the main body of the headrest, firing forward, and contributing to the overall sense of space in the car. This mode enables the loudspeakers to enhance audio experience for all occupants in the car.

In the second position, (speakers 415 and 420 in second positions 416 and 421), an "isolation audio" mode may be provided where the side supports 406 and 407 (e.g., wings of the headrest) deploy outward/forward to bring the loudspeakers closer and more in-line to the passenger's ear canal. The second position adds a significant amount of passive isolation (or blocking) between adjacent passengers. The second position delivers more focused audio reproduction to the primary listener's audio playback system, while simultaneously attenuating some of the acoustic energy from other seat's loudspeakers. This design may be motorized to enable side supports 406 and 407 (e.g., wings) to move automatically between modes. Additionally, the position of side supports 406 and 407 (e.g., wings) could be adjusted continuously to enable advanced head-related loudspeaker positioning and tracking.

FIG. 4 shows generally a passengers position by 440 with directionality of speakers 415 and 420 shown by 445 and 450 in a first position for a spacious configuration. With speakers 415 and 420 in second positions 416 and 421, directionality of the speakers is shown by 445 and 460 such that the speaker output is directed to ear level of the passenger position 440.

According to one embodiment, headrest 400 includes first loudspeaker support 427 and second loudspeaker support 428 as support arms configured to extend relative to the head support such as cushion 405 to position the first and second loudspeakers in the second arrangement. First loudspeaker support 427 and second loudspeaker support 428 are support arms configured to extend relative to the head support of headrest 400 to position the first and second loudspeakers, speakers 415 and 420, relative to a first arrangement and second arrangement, such as a retracted and extended position.

Speakers 415 and 420 may be configured for a first arrangement to direct sound in a first direction and configured to be positioned in a second arrangement to position and direct the first and second loudspeakers in a second direction, the second direction different from the first direction. For example, the first arrangement includes orientation of the first and second loudspeakers to provide a spacious audio configuration and the second arrangement includes orientation of the first and second loudspeakers to provide an isolation audio configuration for a passenger-independent sound experience. Positioning of the first and second loudspeakers is based on a vehicle parameter including at least one of vehicle shutdown, vehicle operational mode, passenger detection, and driving condition.

Figure 5:
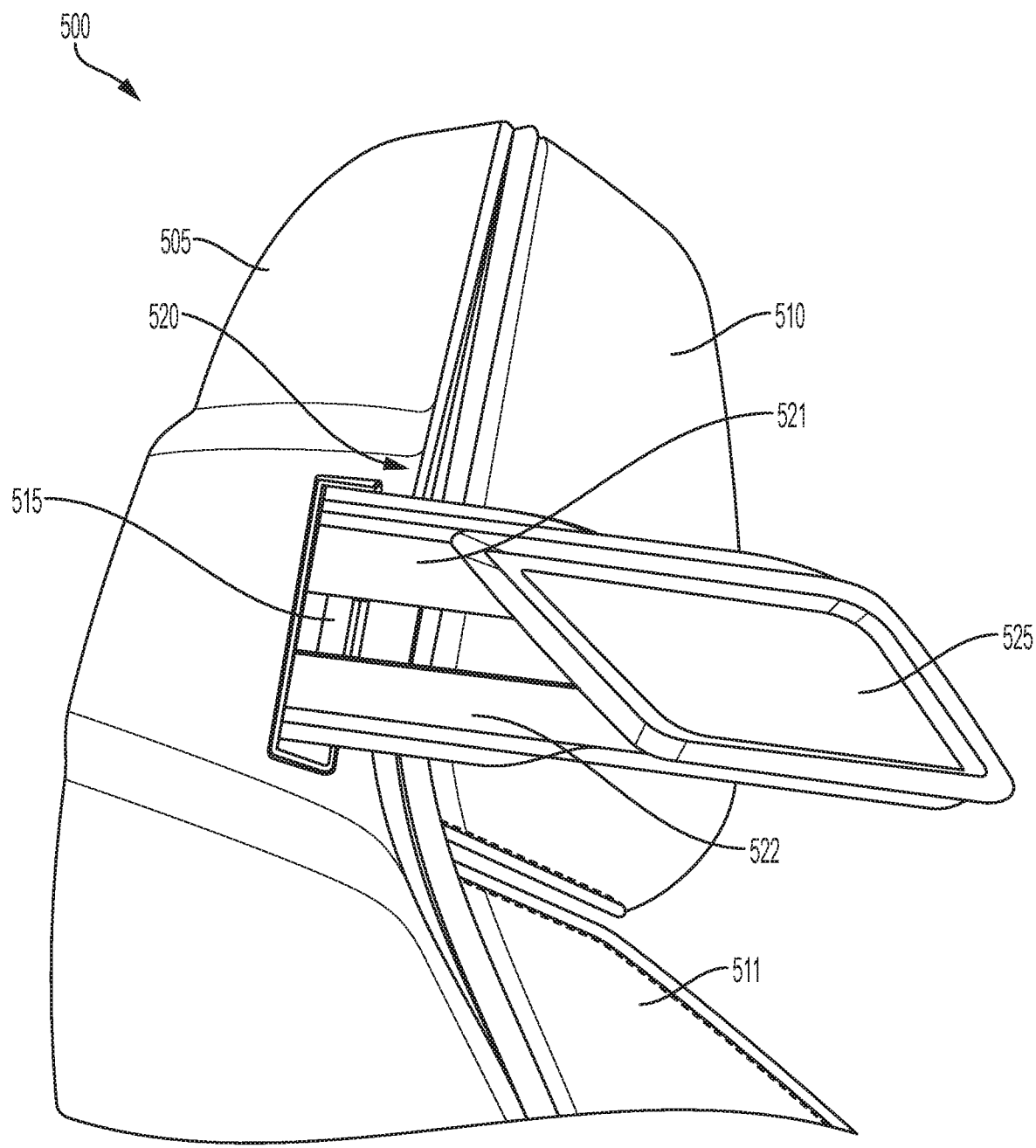
FIG. 5 depicts a graphical representation of a headrest speaker system according to another embodiment.

FIG. 5 depicts a graphical representation of a headrest speaker system according to another embodiment. Vehicle configuration 500 includes a seat support structure 505 that retains headrest cushion 510 and seat back 511. According to one embodiment, a seat support structure, such as support structure 505, includes compartment 515 to allow support 520 to move in and out for positioning of speaker 525. Support 520 may include upper arm 521 and lower arm 522 which can slide in and out of compartment 515. In certain embodiments, compartment 515 may allow for speaker 525 to be retained (either fully or in part). Seat back cushion 511 is supported by seat support structure 505.

Figure 6:
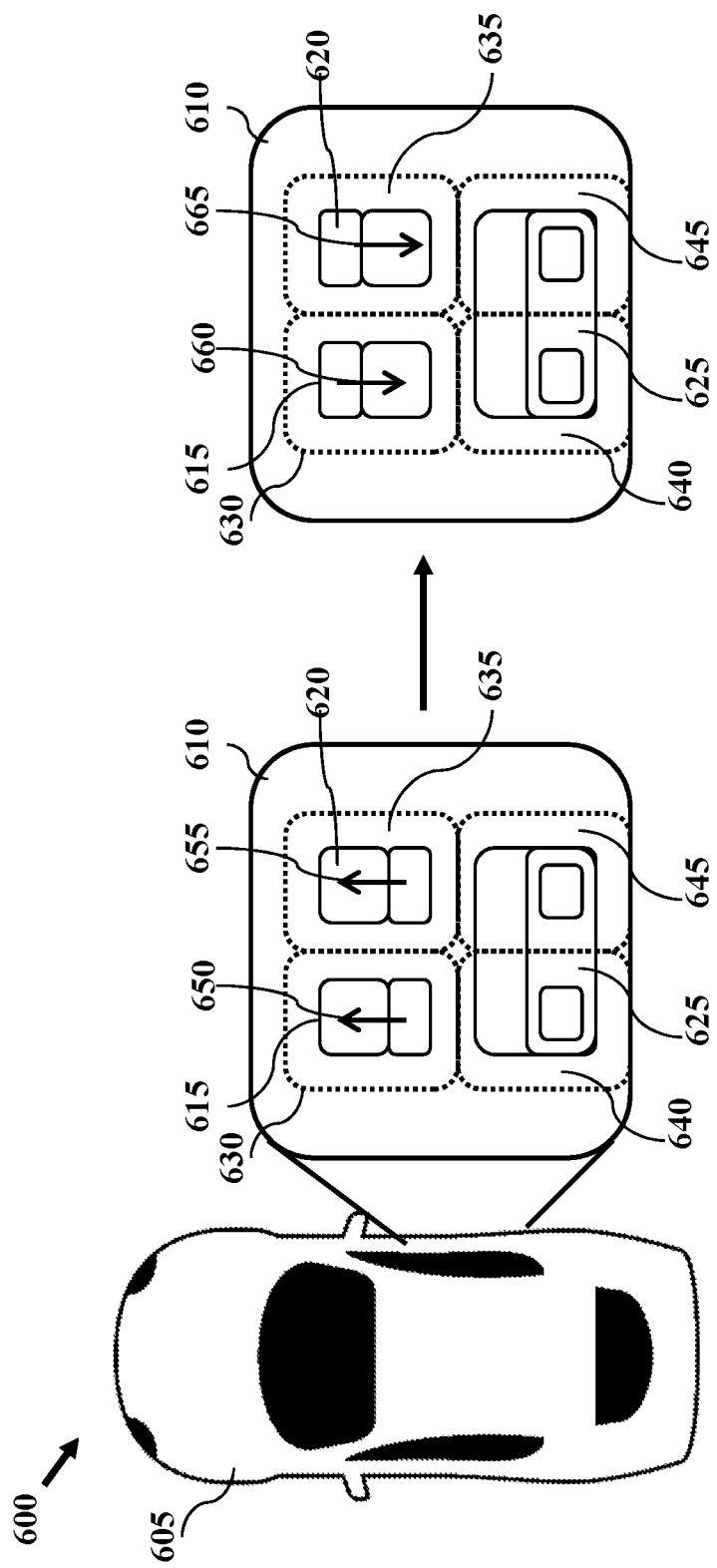
FIG. 6 depicts a vehicle cabin configuration according to one or more embodiments.

FIG. 6 depicts a vehicle cabin configuration according to one or more embodiments. Vehicle cabin configuration 600 for vehicle 605 may allow for one or more sound zones and sound configurations. Cabin 610 includes a plurality of seats. According to one embodiment, individual sound zones may be provided by employing headrest configurations for vehicle seats. Fronts seats, such as driver seat 615 and passenger seat 620 may each be associated with a dedicated zone. Passenger seats, such as rear seat 625, may have multiple zones. Rear seat 625 is shown having a two headrest configuration for a bench seat, but could be configured with three headrests.

Driver zone 630 and passenger zone 635 are shown for driver seat 615 and passenger seat 620. Each zone relates to an an area of the vehicle where sound may be directed and speaker configurations adaptively controlled to allow for an isolation or spacious configuration. Rear zones 640 and 645 are shown for the left and right sections of rear seat 625.

As shown in FIG. 6, each seat and zone identified allows for the headrest to be configured to provide output in at least one of the spacious an isolation configurations. By way of example, when the vehicle detects a vehicle operator without a passenger in driver seat 615, content may be presented within cabin 610 in a spacious mode. Alternatively, headrests of passenger seat 620 and rear seat 625 may present output in a spacious mode, while driver seat 615 is configured in an isolation mode. Alternatively all seats in cabin 610 are configured in an isolation mode and may independently output content.

According to one embodiment, headrest position may be based on or limited to driver or passenger direction. In one embodiment, the extended positioning of the headrest of driver seat 615 may be limited or disabled when facing a front direction, such as direction 650, and similarly for passenger seat 620 facing direction 655. In certain embodiments, vehicle rotation of passenger seats, such as driver seat 615 rotation to direction 660 and passenger seat 620 rotation to direction 665 may allow remove restrictions or allow for driver isolation mode.

While this disclosure has been particularly shown and described with references to exemplary embodiments thereof, it will be understood by those skilled in the art that various changes in form and details may be made therein without departing from the scope of the claimed embodiments.

What is claimed is:

1. A vehicle headrest comprising:
   a head support;
   a first loudspeaker;
   a second loudspeaker;
   a first loudspeaker support configured to position and direct the first loudspeaker; and
   a second loudspeaker support configured to position and direct the second loudspeaker, wherein the first loudspeaker support and second loudspeaker support are coupled to the head support and wherein the first loudspeaker support and second loudspeaker support are configured to position the first and second loudspeakers each in a first arrangement and a second arrangement,
   wherein controlling the first loudspeaker and the second loudspeaker includes automatically arranging the positions of the first loudspeaker and the second loudspeaker based on one or more detected vehicle parameters, and
   wherein the vehicle parameters include at least one of: vehicle shutdown, vehicle speed, and sound parameters within the vehicle.

2. The vehicle headrest of claim 1, wherein the head support includes a headrest cushion, and the first loudspeaker and second loudspeaker are arranged on lateral portions of the head support.

3. The vehicle headrest of claim 1, wherein the head support is configured to receive the first loudspeaker and the second loudspeaker when arranged in a first position.

4. The vehicle headrest of claim 1, wherein the first loudspeaker support and the second loudspeaker support are lateral headrest support elements configured to extend and retract relative to the head support.

5. The vehicle headrest of claim 1, wherein the first loudspeaker support and the second loudspeaker support are support arms configured to extend relative to the head support to position the first and second loudspeakers in the second arrangement.

6. The vehicle headrest of claim 1, wherein the first loudspeaker support and the second loudspeaker support mechanically adjust the position and direction of first and second loudspeakers.

7. The vehicle headrest of claim 1, wherein the first loudspeaker support and the second loudspeaker support are positioned by at least one of a motorized, actuator driven, spring driven and manual positioning.

8. The vehicle headrest of claim 1, wherein the first and second loudspeakers are each configured to be positioned in a first arrangement to direct sound in a first direction and configured to be positioned in a second arrangement to position and direct the first and second loudspeakers in a second direction, the second direction different from the first direction.

9. The vehicle headrest of claim 1, wherein the first arrangement includes orientation of the first and second loudspeakers to provide a spacious audio configuration and the second arrangement includes orientation of the first and second loudspeakers to provide an isolation audio configuration for a passenger-independent sound experience.

10. The vehicle headrest of claim 1, wherein the first loudspeaker support and the second loudspeaker support are configured to arrange speakers in one or more of an extended position, retracted position, and intermediary position.

11. The vehicle headrest of claim 1, wherein the vehicle parameters include occupancy among a plurality of vehicle seats.

12. A method for controlling a vehicle headrest, the method comprising:
    receiving a headrest control signal to position and direct a first loudspeaker and a second loudspeaker, the first loudspeaker coupled to a first loudspeaker support and the second loudspeaker coupled to a second loudspeaker support; and
    controlling the first loudspeaker support and the second loudspeaker support to position the first and second loudspeakers,
    wherein controlling includes automatically arranging the first loudspeaker and the second loudspeaker in one of a plurality of configurations based on one or more detected vehicle parameters, and
    wherein the vehicle parameters include at least one of: vehicle shutdown, vehicle speed, sound parameters within the vehicle, and occupancy among a plurality of vehicle seats.

13. The method of claim 12, wherein the first loudspeaker support and the second loudspeaker support are support arms configured to support and position the first and second loudspeakers, and wherein controlling includes positioning the first loudspeaker and the second loudspeaker from a first position to an extended position.

14. The method of claim 12, wherein controlling includes arranging the first and second loudspeakers in one or more of an extended position, retracted position, and intermediary position.

15. The method of claim 12, wherein controlling includes arranging the first and second loudspeakers in one or more of an isolation mode or spacious mode.

16. A vehicle headrest comprising:
    a head support;
    at least one loudspeaker; and
    at least one loudspeaker support element configured to position and direct the at least one loudspeaker, wherein the at least one loudspeaker element is coupled to the head support element and the at least one loudspeaker, wherein the at least one loudspeaker support element is configured to position the at least one loudspeaker in a first position to direct sound in a first direction and configured to position the at least one loudspeaker in a second position to direction sound in a second direction, wherein controlling includes automatically arranging the first loudspeaker and the second loudspeaker in one of a plurality of configurations based on a detected vehicle parameter, the plurality of configurations including a spacious audio configuration and an isolation audio configuration, and wherein the vehicle parameter is selected from: vehicle shutdown, vehicle speed, a sound parameter within the vehicle, and occupancy among a plurality of vehicle seats.

* * * * *